Aug. 1, 1939.  F. W. SCHWINN  2,167,912
CYCLE-SADDLE SUPPORTING MEANS
Filed Feb. 14, 1936  4 Sheets-Sheet 2
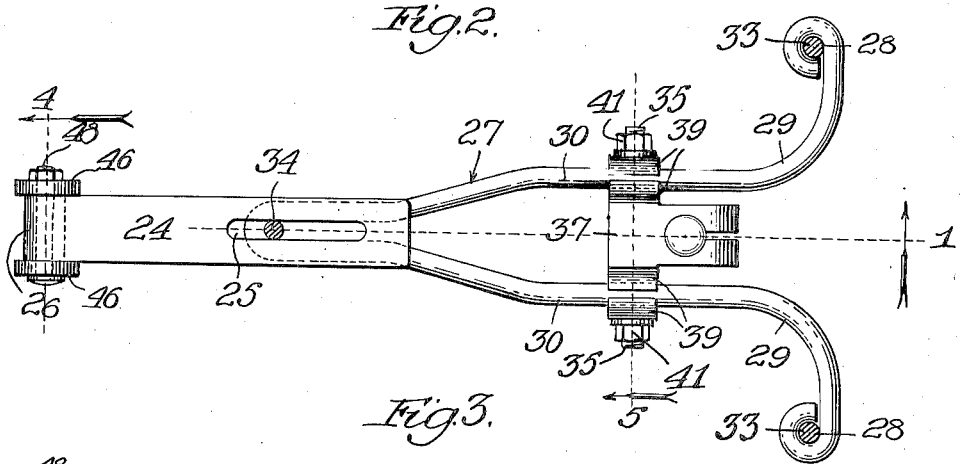
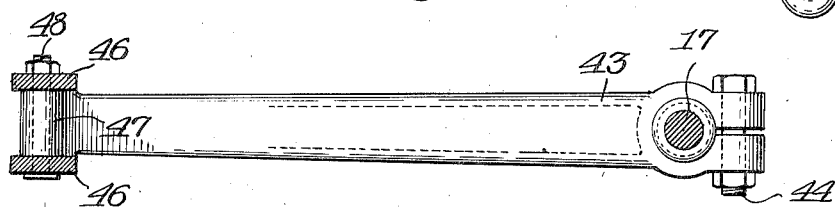
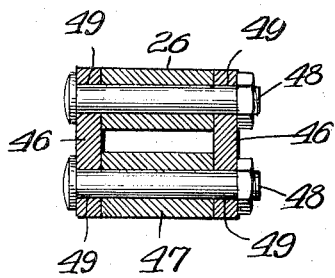
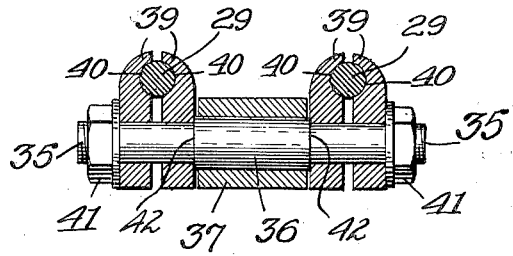
Inventor:
Frank W Schwinn Aug. 1, 1939.   F. W. SCHWINN   2,167,912
CYCLE-SADDLE SUPPORTING MEANS
Filed Feb. 14, 1936   4 Sheets-Sheet 3
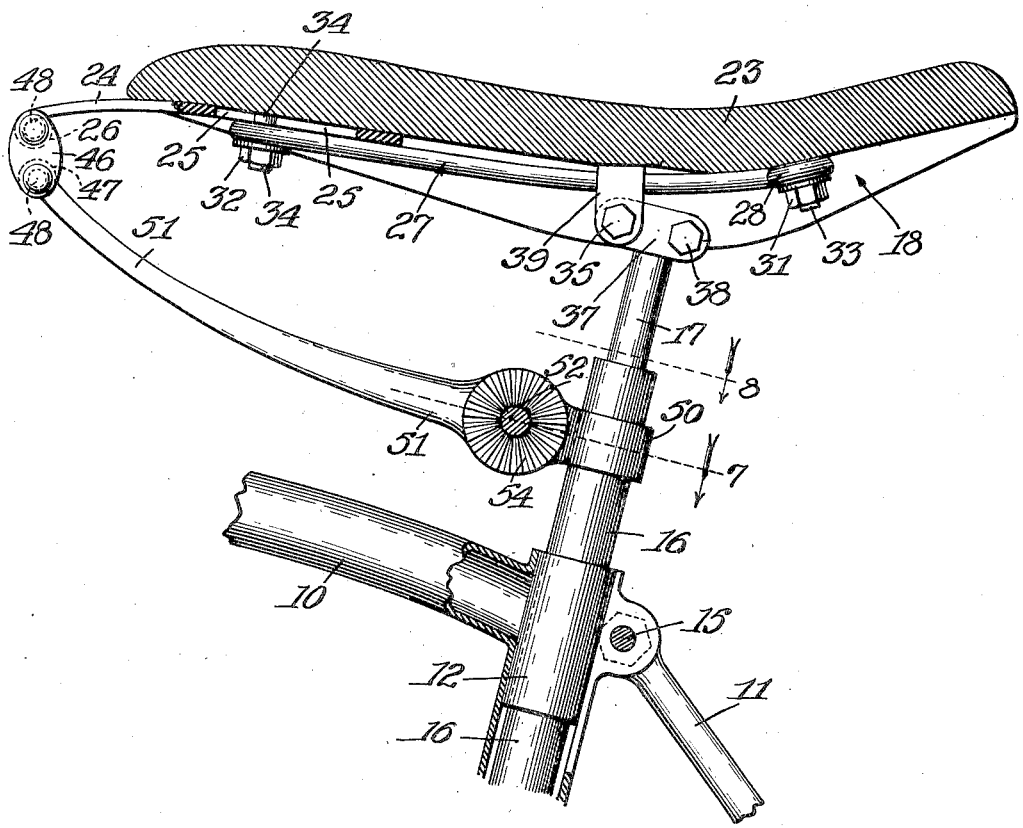
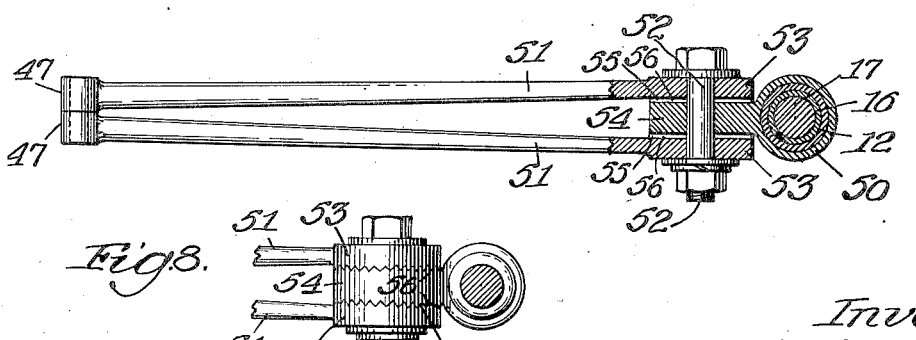

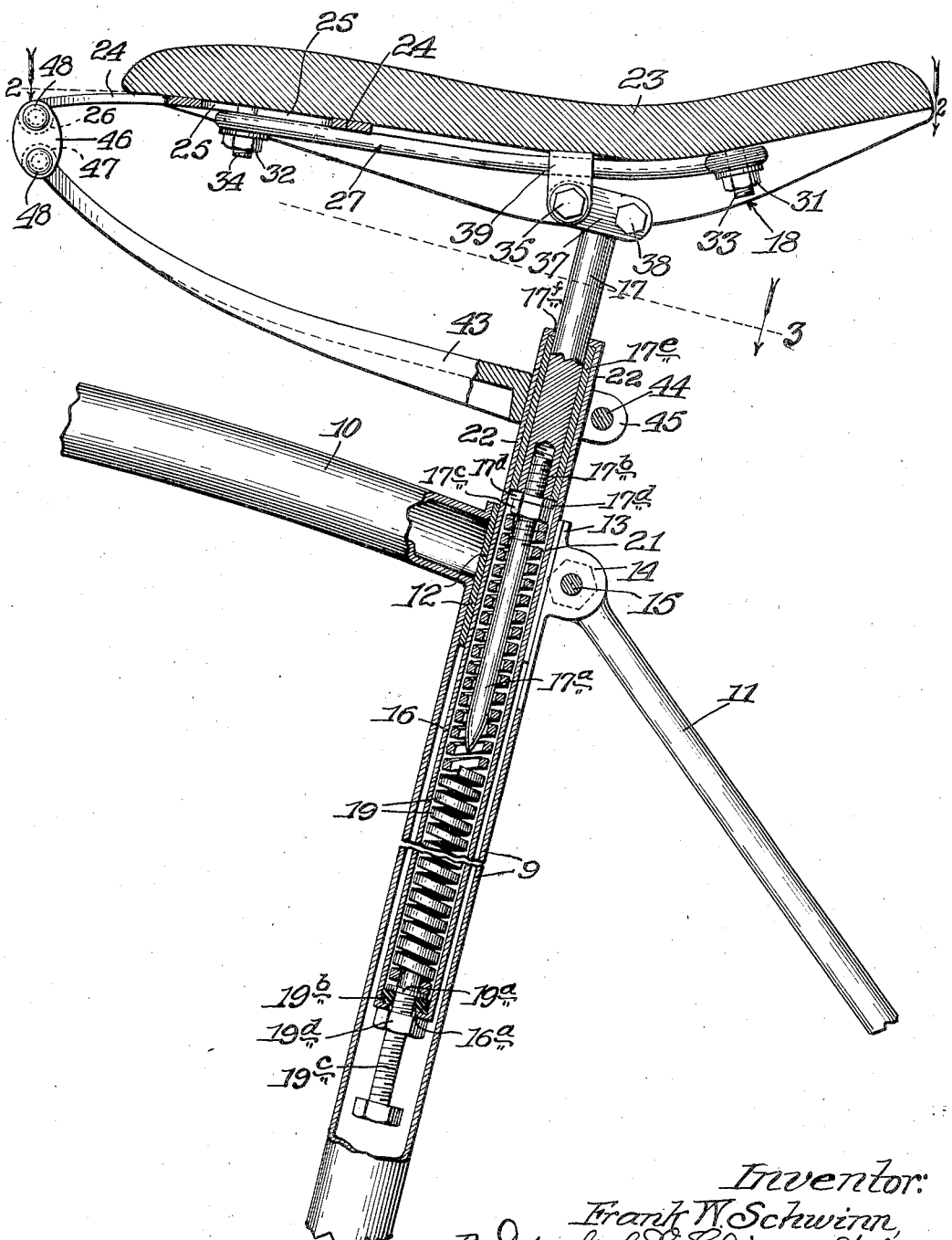

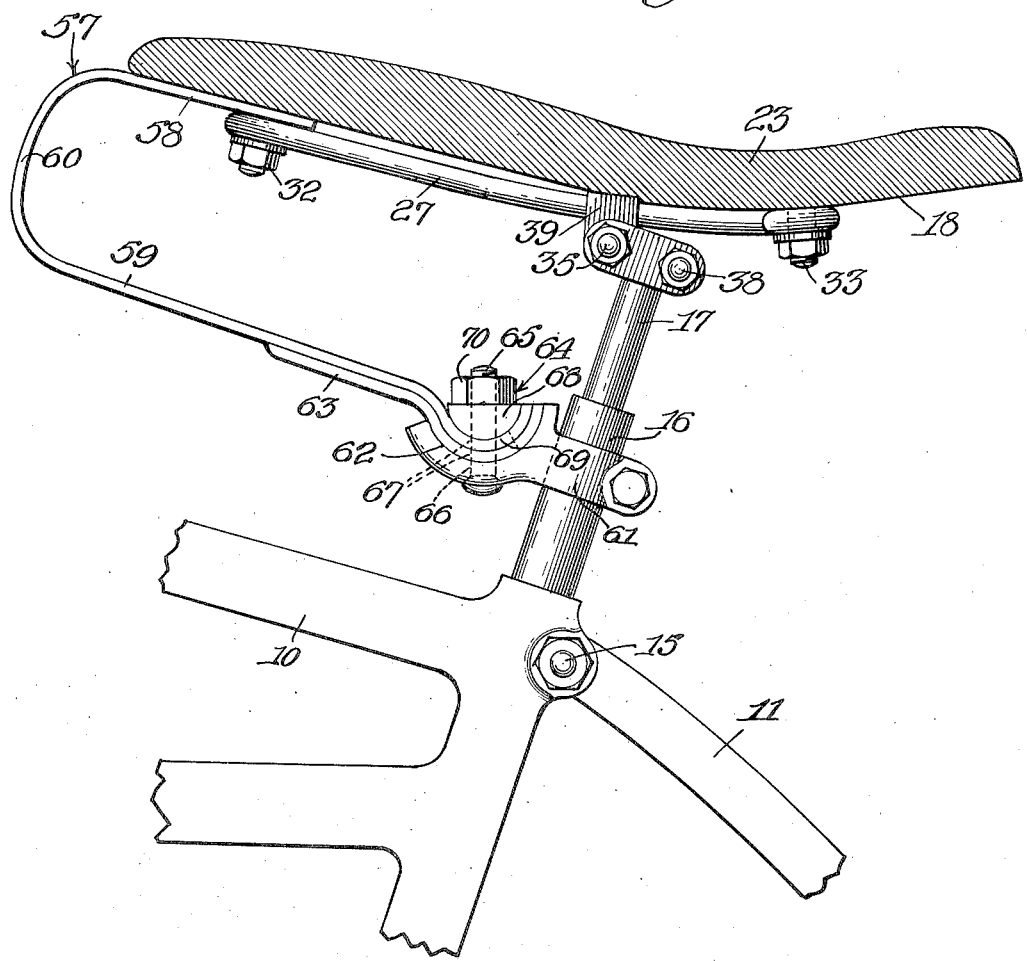

Patented Aug. 1, 1939

2,167,912

UNITED STATES PATENT OFFICE 2,167,912

CYCLE-SADDLE SUPPORTING MEANS

Frank W. Schwinn, Chicago, Ill.

Application February 14, 1936, Serial No. 63,959

10 Claims. (Cl. 155—5.19)

My invention relates more particularly to bicycles and especially to the means for supporting the saddles thereof.

Generally my object is to improve upon the saddle supporting devices of bicycles and similar structures to the end of rendering them better adapted for their purpose and affording the desired adaptability for adjustment of the saddles, to meet the needs of the particular persons using the bicycles; one of my more particular objects being to adapt saddle-supporting constructions of the cushioned or resilient seat-post type to use on rider-propelled vehicles such as bicycles and the like and requiring different adjustments of the saddles to suit the individual requirements of the riders.

Referring to the accompanying drawings:

Figure 1 is a view in side elevation partly sectional, of the saddle-equipped portion of a bicycle embodying my improvements.

Figure 2 is a plan view of the construction shown with the pad portion of the saddle removed, the view being taken at the line 2—2 on Fig. 1 and viewed in the direction of the arrows.

Figure 3 is a section taken at the line 3 on Fig. 1 and viewed in the direction of the arrow.

Figure 4 is an enlarged section taken at the line 4 on Fig. 2 and viewed in the direction of the arrow.

Figure 5 is a section taken at the line 5 on Fig. 2 and viewed in the direction of the arrow.

Figure 6 is a view like Fig. 1 of a modification of the invention.

Figure 7 is a plan view of the saddle adjusting and fulcruming arm of the construction shown in Fig. 6, a portion thereof being shown in section, the section being taken at the line 7 on Fig. 6 and viewed in the direction of the arrow.

Figure 8 is a broken view in section, the section being taken at the line 8 on Fig. 6 and viewed in the direction of the arrows; and Figure 9, a view like Fig. 1 of still another modification of the invention.

Referring to the construction shown in Figs. 1 to 5, inclusive, 9 represents the upper portion of the seat-post mast of a bicycle frame; 10, the upper frame bar thereof; and 11, the usual rearwardly inclined stays of the frame.

The mast 9 is shown as reinforced by an internal split bushing 12, the mast being split lengthwise at 13. A pair of apertured ears 14 at opposite sides of the split 13 in the mast receive a bolt 15 engaging the stays 11 and serving to exert a clamping action on the upper end of the mast and secure the stays in place.

Adjustable up and down in the bushing 12 is a cylinder 16, forming a seat-post, held in position on the frame by means of the clamping bolt 15; and slidable through the upper end of the cylinder 16 is a plunger 17 carrying at its end a saddle represented generally at 18.

The saddle-supporting structure shown is of the cushioned or resilient type and involves a coil spring 19 within the cylinder 16, bearing at its lower end against a button 19a carried by a rod 19c threaded in a nut 19b rigidly secured in the cylinder 16 above a flange 16a, preferably provided as shown by spinning over the metal of the cylinder. The nut 19b is preferably secured against rotation in the cylinder as by being welded therein. The spring 19 at its upper end surrounds a pilot member 17a screwed into a socket 17b in the plunger 17, and held in place by a lock nut 17c with a leather washer 17d interposed. A sleeve 17e surrounds the plunger 17 and extends between the washer 17d and an inwardly extending flange 17f on the upper end of the cylinder 16 formed preferably by spinning over the metal of this end of the cylinder as shown. The above described parts in the cylinder 16 are thus held together as a unit therewith between the flanges 16a and 17f on the opposite ends of the cylinders thereby providing a simple and economical plunger and cylinder mechanism and adapting this mechanism to be readily assembled with cycle frames.

Preferably provision is made for adjusting the tension of the spring 19, this being effected in the construction illustrated by the use of the nut 19b and an adjusting screw 19c which extends through the open, lower, end of the cylinder 16 and screws into the nut 19b and against the button 19a for adjusting the latter up or down depending on whether a stiffer or softer spring action is desired, a lock-nut 19d on the screw 19c holding the screw in adjusted position.

The saddle 18 comprises a pad portion, or saddle proper, 23 provided at its underside with a plate 24 slotted longitudinally at 25 and extending forwardly at its nose portion beyond the front end of the saddle proper 23, the forward extremity of the plate 24 being formed with an eye 26.

Below the plate 24 is a spring member 27 of general yoke form forming a part of the saddle 18 and having widely spaced eyes 28 at the ends of the arms 29 of the yoke which present the parallel portions 30. The member 27 is secured to the saddle proper 23 by nuts 31 and 32 screwed upon threaded studs 33 and 34 depending from the saddle proper 23 and extending through the eyes 28 and the forward looped end of the member 27, the stud 34 also extending through the slot 25 in the plate 24, whereby tightening the nut 32 on the stud 34 also secures the plate 24 to the saddle proper 23 in the relative lengthwise adjustment of these parts.

The saddle 18 is pivotally connected with the upper end of the seat-post plunger 17 by means of a pivoting device comprising a pin 35 journalled to rotate at its central portion 36, of enlarged diameter, in a journaling portion of a split head 37 clamped to the upper end of the plunger 17 by a bolt 38.

The pin 35 is connected with the saddle by means of two sets of clamp elements 39 slidable on the ends of the pin 35 and having clamping recesses 40 at which the portions 30 of the yoke 27 are clamped by means of nuts 41 screwed upon the ends of the pin 35, the inner ones of the clamp elements 39 bearing against annular shoulders 42 presented by the ends of the portion 36 of the pin 35, to prevent binding of these clamp elements against the side of the head 37.

Below the saddle 18 is an arm 43 forming a fulcrum for the front, or nose portion, of the saddle, this arm being mounted on the seat-post cylinder 16 to be adjustable up and down thereon and held in any desired position of adjustment by means of a bolt 44 engaging a pair of ears 45 at a split, clamp, portion of the arm.

The arm 43 is connected at its forward end with the nose portion of the saddle 18 by means of a pair of links 46 located at opposite ends of the eye 26 and a similar parallel eye 47 on the forward end of the arm 43, the links being connected with the eyes by bolts 48 extending through the eyes and through openings 49 in the links to provide pivotal connections between the links and each of these eyes.

As will be understood, the height at which the saddle 18 extends may be regulated by adjusting the seat-post cylinder 16 in the frame; the saddle proper 23 may be adjusted forwardly or backwardly as desired by adjusting it along the clamps 39 and along the plate 24; and the saddle adjusted in a vertical plane to tilt it upwardly or downwardly at its front portion to the desired angle by adjusting the arm 43 up or down, as the case may be, on the cylinder 16, the flexible connection between the saddle and the arm 43 and the pivotal connection between the saddle yoke 27 and the plunger 17 permitting of such movements without binding of the parts.

In all of the various positions of the above referred to adjustments of the parts the plunger 17 is free to slide in the cylinder 16 except as restrained by the spring 19 and the button 19ᵃ which serve to resiliently support the plunger, the pivoted link connection between the sadle proper and the arm 43 permitting of such movement of the plunger without binding of the parts.

The construction shown in Figs. 6, 7 and 8 is the same as that shown in the preceding figures of the drawings (similar parts being correspondingly numbered) except as to the construction of the fulcruming arm for the saddle. In this particular construction the fulcruming arm instead of being provided as a one-piece structure, is formed of two sections 50 and 51. The section 50 surrounds and preferably is rigidly secured to the cylinder 16 as for example by brazing it thereto. The section 51 extends forwardly from the section 50 and is provided at its forward extremity with an eye corresponding with the eye 47 and similarly designated.

The arm section 51 is pivotally connected with the arm section 50 for adjustment on the latter in a vertical plane to regulate the degree of upward or downward tilt of the front end of the saddle. The pivotal connection shown comprises a pivoting bolt 52 extending through the disklike rear ends 53 of two spaced apart bars which together form the arm section 51, and through a disklike extension 54 on the arm section 50 and disposed between the disks 53. The opposing faces of the disks 53 and 54 are shown as radially serrated as indicated at 55 and 56 to form teeth which mutually engage and hold the arm section 51 in the desired position of adjustment, upon the tightening of the bolt 52.

The construction shown in Fig. 9 is substantially the same as that shown in Figs. 1–5, inclusive, of the drawings (similar parts being correspondingly numbered), except as to the construction of means supporting the forward end of the saddle. In this particular construction these means comprise a spring member 57 shown as of general U-shape, its short, upper, arm 58 which forms in effect a nose-piece for the saddle 18 being connected with the saddle as described of the nose-piece 24. The longer, lower, arm of the spring member 57 and represented at 59, connects with the arm 58 through the medium of the bowed portion 60 of the spring member 57 and is supported at its rear end by the cylinder 16 in a manner to permit the saddle to be adjusted in a vertical plane to regulate the degree of upward or downward tilt of the forward end of the saddle. The means shown for this purpose comprise a head 61 surrounding, and rigidly adjustably secured to, the cylinder 16 and having at its forward end an upwardly opening recess 62 of semi-cylindrical shape. The rear end of the arm 59 of the spring has preferably associated with it at its under side a short leaf spring section 63 which, with the arm 59, is bent as represented at 69 to conform to the socket in the recess 62, and afford a pivoting point between the spring 57 and head 61, these parts being releasably rigidly connected together in adjusted position by means of a clamping bolt device 64 comprising a headed shank 65 extending through an opening 66 in the head 61 at its recessed portion, through peripherally elongated slots 67 in the spring members 59 and 63, and through a semi-cylindrical washer 68 which seats in the recess of portion 69 of the spring-arm 59; and a nut 70 screwed on the threaded end of the shank 65 and clamping these several parts together.

While I have illustrated and described particular constructions constituting embodiments of my invention I do not wish to be understood as intending to limit the invention thereto as the same may be variously modified and altered and the invention embodied in other forms of construction without departing from the spirit of my invention.

What I claim as new, and desire to secure by Letters Patent, is:

1. A saddle and supporting structure therefor comprising a member for attaching to a cycle frame, a saddle, means resiliently supporting said saddle on said member and on which said saddle is adapted to be tilted into different positions in a vertical plane, and an arm on said member extending forwardly therefrom and flexibly connected at its forward end with said saddle for supporting the forward end of said saddle, said arm being adjustable up and down on said member for varying the height at which the forward end of said saddle extends.

2. A saddle and supporting structure therefor comprising a member for attachment to a cycle frame, a saddle, means resiliently supporting said saddle on said member and on which said saddle is adapted to be tilted into different poasitions in a vertical plane, means on said member extending forwardly therefrom and having pivoted link connection at its forward end with said saddle for supporting the forward end of said saddle, said last-named means being adjustable for varying the height at which the forward end of said saddle extends and means for relative longitudinal adjustment between said pivoted link connection and said saddle.

3. A saddle and supporting structure therefor comprising a member for attachment to a cycle frame, a saddle, means resiliently supporting said saddle on said member and on which said saddle is adapted to be tilted into different positions in a vertical plane, means on said member extending forwardly therefrom and flexibly connected at its forward end with said saddle for supporting the forward end of said saddle through the medium of link means pivotally connected with the forward end of said saddle and with the forward end of said second-named means, said second-named means being adjustable for varying the height at which the forward end of said saddle extends and means for relative longitudinal adjustment between said pivoted link connection and said saddle.

4. A saddle and supporting structure therefor comprising a member for attachment to a cycle frame, a saddle, means resiliently supporting said saddle on said member and comprising a plunger slidable in said member and means resiliently supporting said plunger, said saddle being flexibly connected with said plunger to adapt said saddle to be tilted into different positions in a vertical plane, and means on said member extending forwardly therefrom for supporting the forward end of said saddle, and means to adjust the vertical angle between said forwardly extending means and said member for varying the height at which the forward end of said saddle extends.

5. A saddle and supporting structure therefor comprising a member for attachment to a cycle frame, a saddle, a forwardly extending nose-piece on said saddle, said saddle and nose-piece being relatively adjustable lengthwise of the saddle, means for resiliently supporting said saddle on said member, pivoting means connecting said saddle with said first-named means, said last-named means and said saddle being relatively adjustable lengthwise of the saddle, a forwardly extending projection on said member, and means flexibly connecting the forward end of said nose-piece with said projection.

6. In a cycle, the combination with its frame, of a saddle, having a forwardly extending nose-piece contacting the saddle, said saddle and nose-piece being relatively adjustable lengthwise of the saddle, means for supporting said saddle on said frame and adapted for adjustment of said saddle in a lengthwise direction and means for supporting said saddle at its nose-piece from the frame.

7. A saddle and supporting structure therefor comprising a member for attachment to a cycle frame, a saddle, a yoke on said saddle, a plunger, clamp means adjustable longitudinally of the yoke and pivoted to the upper end of the plunger, said plunger being constrained to slide rectilinearly in said member, resilient means mounted within said member resiliently supporting said plunger and means connected with and extending forwardly from said member to said yoke, to flexibly support the forward end of said saddle for yielding in all positions of the plunger.

8. A saddle and supporting structure therefor comprising a member for attachment to a cycle frame, a saddle, means resiliently supporting said saddle on said member and on which said saddle is adapted to be tilted into different positions in a vertical plane, said means comprising a spring within the member on which the plunger rests, clamps means adjustable longitudinally of the saddle and pivoted to the upper end of the plunger, an arm on said member extending forwardly therefrom and connected at its forward end with said saddle for supporting the forward end of said saddle for yielding movement in all positions of said plunger, and means for adjusting the forward end of the arm upwardly and downwardly for varying the height at which the forward end of the saddle extends.

9. A saddle and supporting structure therefor comprising a member for attachment to a cycle frame, a saddle, means resiliently supporting said saddle on said member and on which said saddle is adapted to be tilted into different positions in a vertical plane, and an arm on said member extending forwardly therefrom and flexibly connected at its forward end with said saddle for supporting the forward end of said saddle, and means adjacent said member for swinging said arm upwardly and downwardly for varying the height at which the forward end of said saddle extends.

10. A saddle and supporting structure therefor comprising a member for attachment to a cycle frame, a saddle, means resiliently supporting said saddle on said member and on which said saddle is adapted to be tilted into different positions in a vertical plane, and an arm on said member extending forwardly therefrom and flexibly connected at its forward end with said saddle for supporting the forward end of said saddle, an arm section on said member, said arm and arm section having engaged arcuate surfaces whereby said arm is adapted for swinging upwardly and downwardly for varying the height at which the forward end of said saddle extends, and means for clamping said arcuate surfaces together.

FRANK W. SCHWINN.